United States Patent
Villalva Sanchez et al.

(10) Patent No.: US 10,093,274 B2
(45) Date of Patent: Oct. 9, 2018

(54) BRACKET FOR SLIDING MECHANISM

(71) Applicant: FORD GLOBAL TECHNOLOGIES, LLC, Dearborn, MI (US)

(72) Inventors: Pablo Isaac Villalva Sanchez, Mexico City (MX); Diego Fabricio Villacres Mesias, San Mateo Atenco (MX)

(73) Assignee: Ford Global Technologies LLC, Dearborn, MI (US)

( * ) Notice: Subject to any disclaimer, the term of this patent is extended or adjusted under 35 U.S.C. 154(b) by 43 days.

(21) Appl. No.: 15/354,494

(22) Filed: Nov. 17, 2016

(65) Prior Publication Data

US 2018/0134249 A1    May 17, 2018

(51) Int. Cl.
| | |
|---|---|
| *B60R 13/02* | (2006.01) |
| *B60R 22/20* | (2006.01) |
| *B60R 22/24* | (2006.01) |
| *B60R 21/055* | (2006.01) |
| *B60R 22/18* | (2006.01) |

(52) U.S. Cl.
CPC .......... *B60R 22/201* (2013.01); *B60R 13/025* (2013.01); *B60R 21/055* (2013.01); *B60R 22/24* (2013.01); *B60R 2013/0287* (2013.01); *B60R 2022/1818* (2013.01)

(58) Field of Classification Search
CPC ... B60R 13/02; B60R 13/0237; B60R 13/025; B60R 22/20; B60R 22/201; B60R 22/24; B60R 21/055; B60R 2022/1818; B60R 2013/0287; B62D 25/04
USPC ..... 280/801.2, 804, 808; 296/1.08; 297/482, 297/483
See application file for complete search history.

(56) References Cited

U.S. PATENT DOCUMENTS

| | | | |
|---|---|---|---|
| 5,044,666 | A | 9/1991 | Griesemer |
| 5,863,071 | A | 1/1999 | Li-Calso |
| 6,059,342 | A | 5/2000 | Kawai et al. |
| 6,244,626 | B1 | 6/2001 | Monaghan et al. |
| 6,929,286 | B2 | 8/2005 | Bertelle et al. |

(Continued)

FOREIGN PATENT DOCUMENTS

| | | |
|---|---|---|
| CN | 1414916 A | 4/2003 |
| CN | 202782988 U | 3/2013 |

(Continued)

OTHER PUBLICATIONS

English Machine Translation of CN1414916A.

(Continued)

*Primary Examiner* — Keith J Frisby
(74) *Attorney, Agent, or Firm* — Vichit Chea; King & Schickli PLLC

(57) ABSTRACT

A sliding mechanism includes a first part and a second part adapted for sliding translation within the first part. A bracket attached to the first part includes a bracket guide rib structure for constraining a lateral motion of the second part, including a rib defining an unbroken interface surface for the second part. The bracket guide rib structure may include a continuous rib member defining a continuous a continuous planar slider interface surface, a sinusoidal wave pattern, or a trapezoidal wave pattern. The sinusoidal wave pattern and the trapezoidal wave pattern may include a plurality of waves having a same or a different wave frequency.

19 Claims, 5 Drawing Sheets

(56) References Cited

U.S. PATENT DOCUMENTS

| | | |
|---|---|---|
| 7,198,300 B2 | 4/2007 | Daume et al. |
| 7,934,748 B2 | 5/2011 | Torii |
| 7,963,551 B2 | 6/2011 | Matsuoka et al. |
| 8,403,612 B2 | 3/2013 | Wright et al. |
| 2005/0253366 A1 | 11/2005 | Uno et al. |
| 2007/0138783 A1 | 6/2007 | Gleason et al. |
| 2007/0241549 A1 | 10/2007 | Boelstler et al. |
| 2016/0001737 A1 | 1/2016 | Ando |
| 2017/0106811 A1 | 4/2017 | Dublan et al. |

FOREIGN PATENT DOCUMENTS

| | | |
|---|---|---|
| CN | 203974712 U | 12/2014 |
| EP | 3018016 A1 | 5/2016 |
| JP | H02120152 A | 5/1990 |
| JP | 2001328508 A | 11/2001 |
| JP | 2006-346251 A * | 12/2006 |

OTHER PUBLICATIONS

English Machine Translation of CN202782988U.
English Machine Translation of CN203974712U.
English Machine Translation of JP2001328508A.
English Machine Translation of JPHH02120152A.
Office Action dated Apr. 11, 2018 for U.S. Appl. No. 15/354,368, filed Nov. 17, 2016.

* cited by examiner

BRACKET FOR SLIDING MECHANISM

TECHNICAL FIELD

This disclosure relates generally to sliding mechanisms for vehicle parts. In particular, the disclosure relates to a bracket configured for attaching to a first vehicle part, the bracket including a guide rib structure for improving a sliding translation between the first vehicle part and a second vehicle part.

BACKGROUND

For vehicles wherein a movable vehicle part generally referred to as a slider slidingly translates from one position to another relative to another vehicle part, a smooth sliding action is essential for user satisfaction. Any discontinuity or erratic movement between the slider and the other vehicle part contributes to user dissatisfaction, being interpreted as improper fit and/or finish.

Preliminarily, various terms are used herein to describe movement of vehicle parts relative to one another, such as movement of a slider on and/or in another vehicle part. As used herein, unless stated otherwise motion descriptors such as "vertical," "up-down," "upwardly," "downwardly," "lateral," "laterally," and "side to side" refer to movement of a slider relative to a path of travel of the slider on and/or in another vehicle part.

With reference to FIG. 1A, as an example a B-pillar trim piece 100 is often provided with a hidden gap hider configured as a D-ring slider 110 for adjusting a seat belt height adjuster mechanism (not shown). The B-pillar trim piece 100 serves as a substrate against and within which the D-ring slider 110 slidingly translates upwardly and downwardly to adjust a height of the seat belt height adjuster mechanism to a user's personal preference. The "ideal" slider 110 geometry requires opposed linear continuous edges 115 at least at a portion of the slider that will interface with an interior of the trim piece 100 (see FIG. 1B).

To control this relative sliding motion, the B-pillar trim piece 100 is provided with various structures to constrain vertical and lateral movement of the D-ring slider 110, to ensure that the D-ring slider only moves in the desired directions. Typically this is done using various guide rib structures 120 (see inset in FIG. 1A) to constrain lateral movement of the D-ring slider 110 and various other guide structures (not visible in this view) to constrain vertical movement of the D-ring slider.

These guide rib structures 120 typically include a plurality of ribs 130 which are oriented in a substantially vertical orientation. That is, as shown in the drawing figure, relative to a path of travel T of the D-ring slider 110 the ribs 130 are oriented in a substantially vertical orientation which is substantially perpendicular to the D-ring slider 110's path of travel T. Thus, the D-ring slider 110 contacts the ends of multiple ribs 130 of the guide rib structures 120 as it slidingly translates over/within the B-pillar trim piece 100.

Such guide rib structures 120, while serving to constrain lateral movement of the D-ring slider 110, are flawed because of the separation between the rib 130 ends, which are tactilely perceived as intermittent points of contact or "steps" between the D-ring slider and the B-pillar trim piece 100 along the D-ring slider path of travel T.

An ideal solution would be to provide a guide rib structure 120 that is integral to the B-pillar trim piece 100 and which maintains an uninterrupted sliding contact between the D-ring slider 110 and the B-pillar trim piece as the D-ring slider translates over its path of travel T. To provide such uninterrupted or continuous sliding contact between the slider 110 and the trim piece 100, geometries of the slider and the trim piece must be coordinated. That is, the geometries of the slider 110 and the B-pillar trim piece 100 must be consistent or must include structures such as guide rib structures providing such consistent geometries where needed.

FIG. 2 illustrates such an exemplary "ideal" guide rib structure providing a consistent geometry at least at an interface between a slider 110 and a B-pillar trim piece 100 (or other substrate). In the drawing figure, a substrate 200 is shown including a guide structure 210 for constraining vertical movement of a slider 220 and a guide rib structure 230 for constraining lateral movement of the slider. The guide structure 210 comprises a plurality of ribs 240 which contact a surface of the slider 220 to constrain vertical movement. The guide rib structure 230 is defined by a single rib 250 which maintains a constant contact with an edge of the slider 220 to constrain lateral movement. The rib 250 is integral to the substrate 200, contacts the substrate at two points of contact 260a, 260b, and defines a hollow throughbore 270.

Unfortunately, particularly in the case of molded plastic parts which must be extracted from a mold, this solution is not feasible using conventional manufacturing processes employing conventional tooling. This is in part due to the relative size of the substrate 200, the relative fragility of the guide rib structure 230/rib 250 and the difficulty of extracting both from a same mold in a single action. In particular, it would be difficult or impossible without use of specialized molding/injection techniques to provide a mold that could concurrently define the substrate 200, the guide structure 210 and the integral rib 250 in a manner that the molded piece could be removed without damaging some portion of the structure. Use of specialized techniques such as gas-assisted injection would cause gas to fill an inner void space between the guide rib structure 230 and the rib 250, in which case the component geometry would not be a hollow through-bore but instead would be a closed shell.

Thus, a need is identified in the art for vehicle parts including guide rib structures for constraining lateral motion of a moving part such as a slider, which provide or at least approach the ideal solution of a constant point of contact between the slider and the vehicle part but for which fabricating by conventional molding processes is feasible.

SUMMARY

In accordance with the purposes and benefits described herein and to solve the above-summarized and other problems, in one aspect of the present disclosure a sliding mechanism is provided, comprising a first part, a second part adapted for sliding translation within the first part, and a bracket attached to the first part comprising a bracket guide rib structure for constraining a lateral motion of the second part, including a rib defining an unbroken interface surface for the second part. The bracket guide rib structure comprises a continuous rib member.

In embodiments, the continuous rib member defines a continuous planar slider interface surface. In an alternative embodiment, the continuous rib member defines a sinusoidal wave pattern. In yet another alternative embodiment, the continuous rib member defines a trapezoidal wave pattern. In embodiments, the sinusoidal wave pattern and the trapezoidal wave pattern may comprise a plurality of waves having a same or a different wave frequency.

In embodiments, the bracket further includes a guide structure configured to constrain an up-down motion of the second part. The bracket guide rib structure may be connected to the guide structure at one or more junctures.

In another aspect of the disclosure, a trim assembly for a seat belt height adjusting mechanism is provided, comprising a pillar trim panel, a slider adapted for sliding translation within the pillar trim panel, and a bracket attached to the pillar trim panel comprising a bracket guide rib structure including a rib defining an unbroken interface surface for the slider. The bracket guide rib structure constrains a lateral motion of the slider, and may comprise a continuous rib member.

In embodiments, the continuous rib member defines a continuous planar slider interface surface. In an alternative embodiment, the continuous rib member defines a sinusoidal wave pattern. In yet another alternative embodiment, the continuous rib member defines a trapezoidal wave pattern. In embodiments, the sinusoidal wave pattern and the trapezoidal wave pattern may comprise a plurality of waves having a same or a different wave frequency.

In embodiments, the bracket further includes a pillar trim panel guide structure configured to constrain an up-down motion of the slider. The bracket guide rib structure may be connected to the pillar trim panel guide structure at one or more junctures.

In the following description, there are shown and described embodiments of the disclosed bracket for sliding mechanism. As it should be realized, the described devices are capable of other, different embodiments and their several details are capable of modification in various, obvious aspects all without departing from the devices and methods as set forth and described in the following claims. Accordingly, the drawings and descriptions should be regarded as illustrative in nature and not as restrictive.

BRIEF DESCRIPTION OF THE DRAWINGS

The accompanying drawing figures incorporated herein and forming a part of the specification, illustrate several aspects of the guide rib structure for sliding mechanism, and together with the description serve to explain certain principles thereof. In the drawings.

Reference will now be made in detail to embodiments of the disclosed bracket for sliding mechanism, examples of which are illustrated in the accompanying drawing figures.

DETAILED DESCRIPTION

To solve the foregoing and other problems, at a high level the present disclosure provides a bracket for use in conjunction with a substrate and a slider configured for sliding translation on and/or within the substrate. The bracket comprises a guide rib structure for constraining lateral movement of the slider which, by provision of a continuous rib member having a particular configuration, provides an uninterrupted and continuous point of contact at an interface of the slider and the substrate, or at least significantly increases the amount of contact between the substrate and slider to simulate such uninterrupted and continuous contact.

Figure 3:
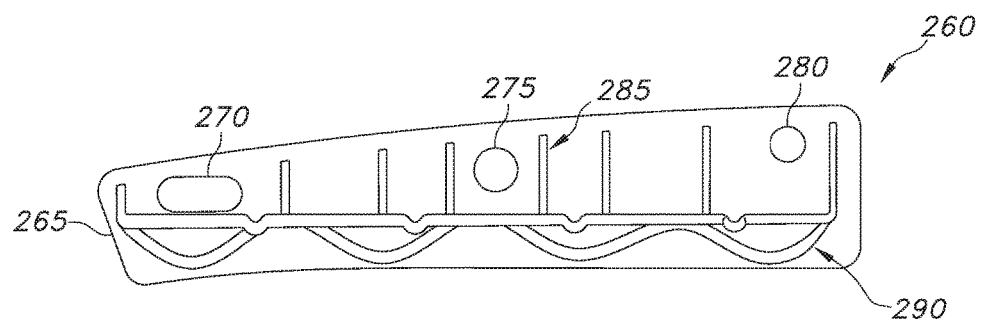
FIG. 3 depicts a bracket including a guide rib structure according to the present disclosure.

With reference to FIG. 3, a bracket 260 includes a body 265 carrying one or more apertures for positioning the bracket on a portion of a substrate (not shown in this view). The apertures may be configured as one or more of a two-way locator 270, an oversized aperture 275, and a four-way locator 280. In the depicted embodiment, the bracket 260 is dimensioned and configured to secure to an interior surface of the substrate. Heat stakes (not shown) may be provided to allow welding the bracket 260 to the substrate once properly positioned. The bracket 260 further includes a plurality of constraining structures for constraining a lateral and/or an up-down movement of a slider (not shown) within the substrate (not shown). As will be described in more detail below, these constraining structures include a guide structure 285 for constraining up-down movement of the slider and a guide rib structure 290 for constraining a lateral movement of the slider.

Figure 4:
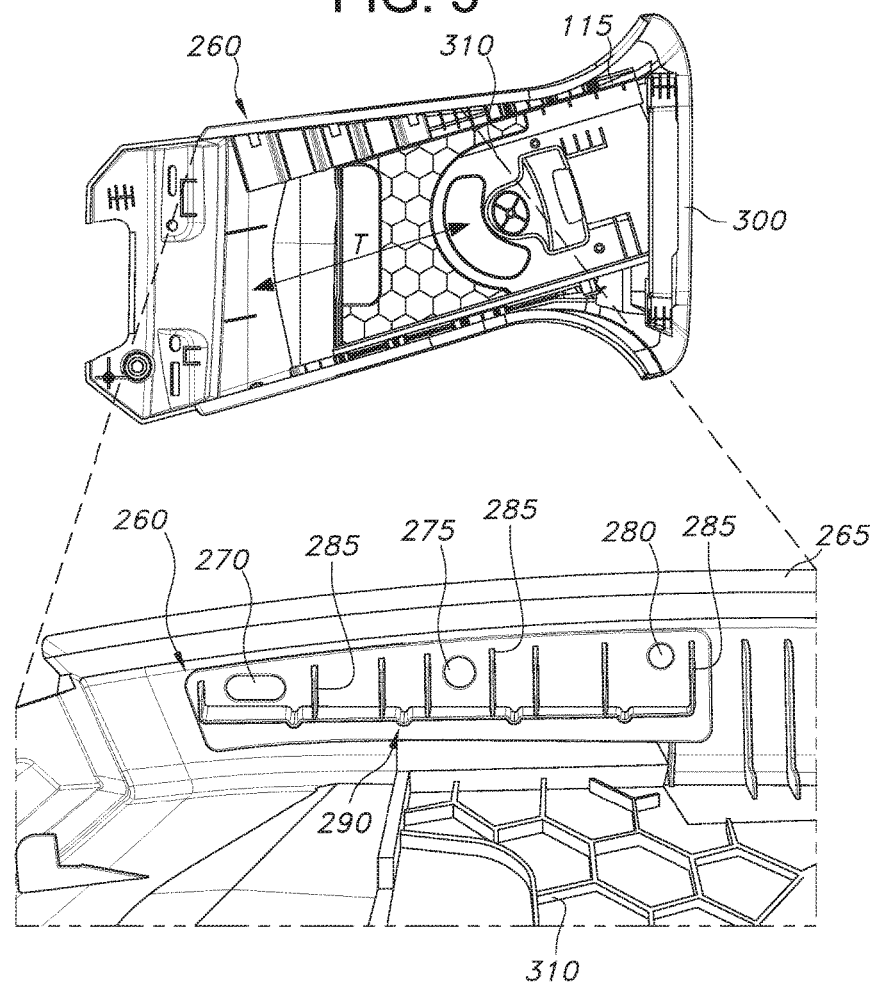
FIG. 4 shows the bracket of FIG. 3, in place in an assembly including a substrate and associated slider.

In more detail, FIG. 4 shows an assembly comprising a substrate 300, a slider 310, and a bracket 260 as described above, configured for a sliding translation of the slider within a portion of the substrate. As will be appreciated, the bracket body 265 may include an outer surface (not visible in this view) configured for a close nesting fit to a portion of an interior surface of the substrate 300. In the depicted embodiment, the substrate 300 is configured as a B-pillar trim piece and the slider 310 is configured as a gap hider for a seat belt height adjustment mechanism (not shown). However, as will be appreciated, the substrate 300 and slider 310 are easily adapted to other uses, and so this example will not be taken as limiting. In the depicted embodiments, the substrate 300 and slider 310 may be manufactured by a suitable molding process as is commonly used in the automotive industry, such as injection molding. The substrate 300 and slider 310 may be fabricated of a suitable plastic or polymer as is known in the art.

Figure 1A:
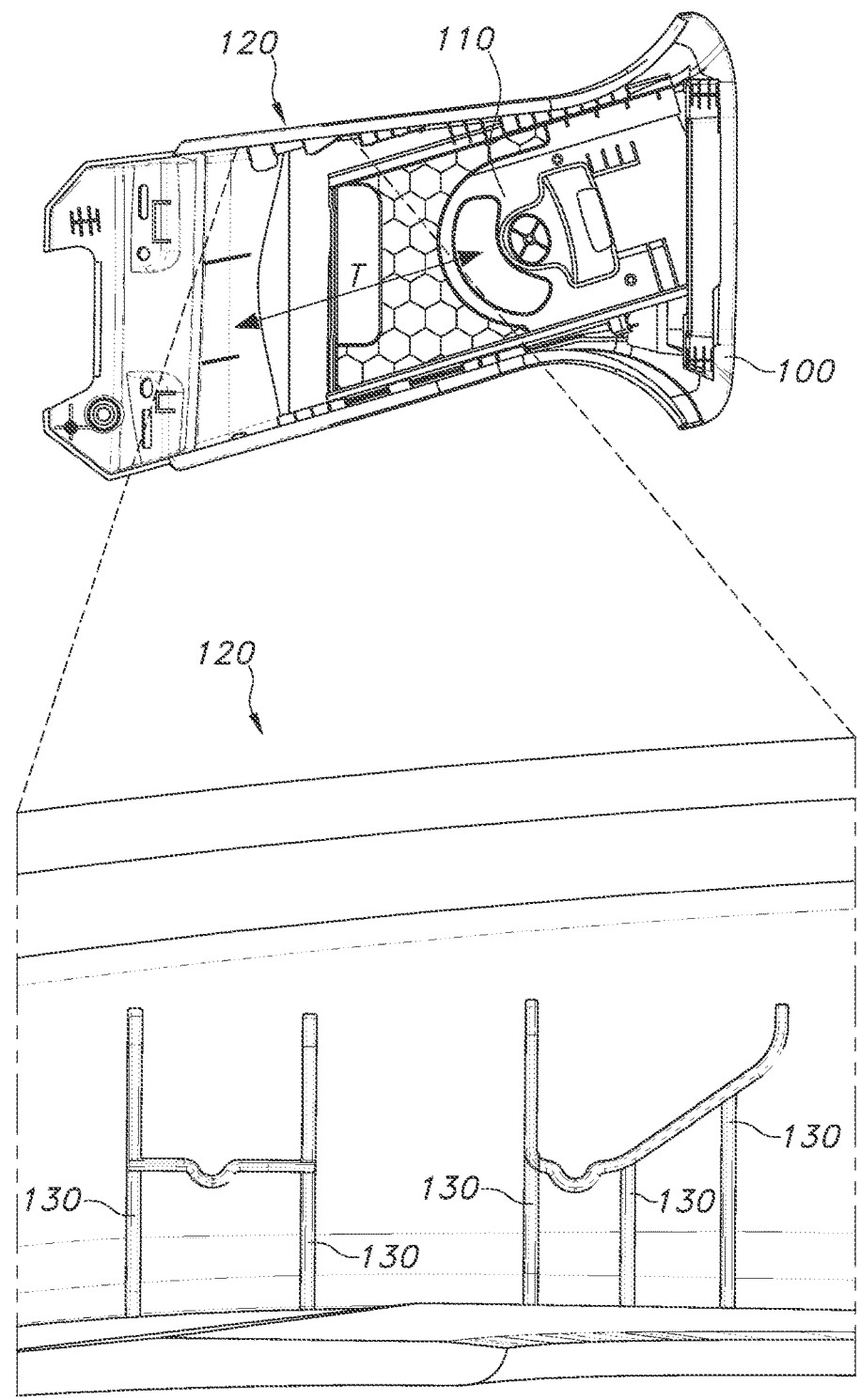
FIG. 1A illustrates a prior art guide rib structure for a sliding mechanism, in the depicted embodiment being a B-pillar trim piece having a D-ring slider or gap hider.
Figure 1B:
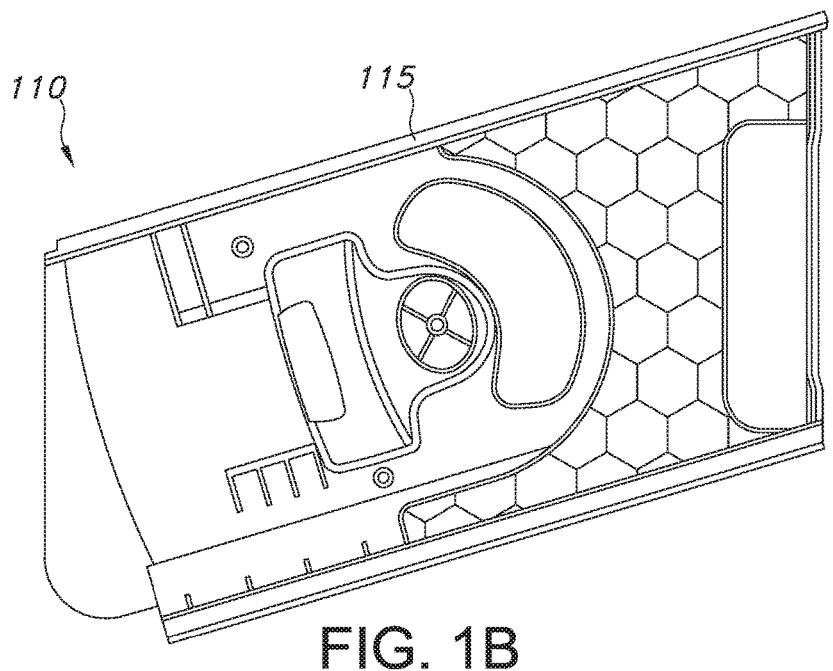
FIG. 1B illustrates an "ideal" slider geometry.

As can be seen from the FIG. 4 inset portion, the bracket 260 is configured to, by the constraining structures described above, constrain up-down motion of the slider 310 by way of the guide structure 285. Likewise, by guide rib structure 290 the bracket 260 constrains lateral motion of the slider 310. The guide rib structure 290 may further be configured to account for differences in geometry between the slider 310 and the substrate 300 as shown in FIG. 4, whereby the "ideal" slider geometry as shown in FIG. 1B may be implemented in a substrate 300 of any desired geometry, matching or not.

Figure 5A:
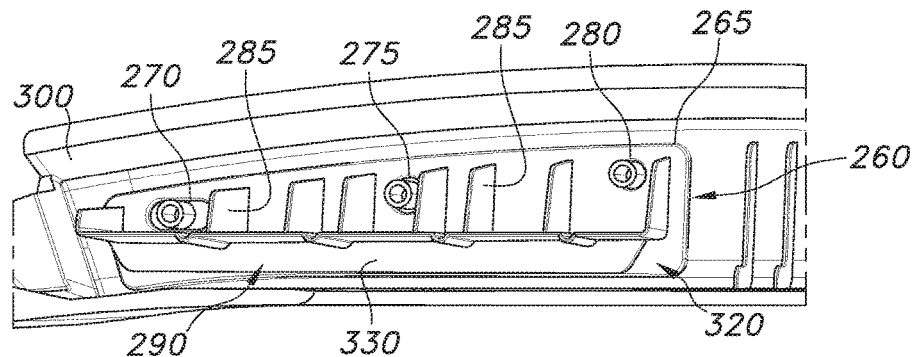
FIG. 5A depicts a bracket including an embodiment of a guide rib structure according to the present disclosure.

Various embodiments of the guide rib structure 290 are contemplated. With reference to FIG. 5A, in one embodiment the guide rib structure 290 is provided by a continuous rib member 320 defining a continuous planar slider interface surface 330. As will be appreciated, by this continuous planar slider interface surface 330 an uninterrupted interface for the slider 310 is provided, i.e. similar to the "ideal" guide rib structure shown in FIG. 2. Because the bracket 260 is manufactured using separate tooling, this more complex structure can be provided.

Figure 5B:
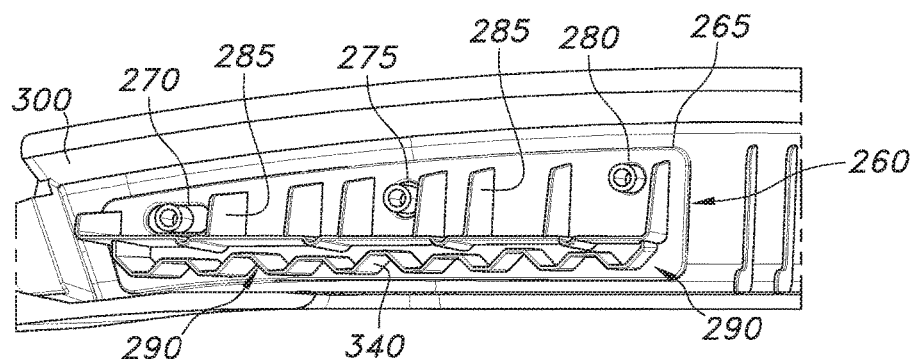
FIG. 5B depicts a bracket including an alternative embodiment of a guide rib structure according to the present disclosure.
Figure 5C:
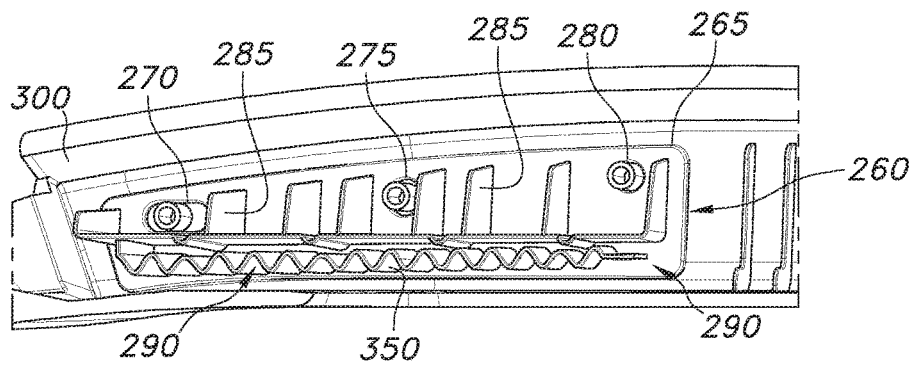
FIG. 5C depicts bracket including another alternative embodiment of a guide rib structure according to the present disclosure.

FIG. 5B depicts an alternative embodiment of a bracket 260 including a guide rib structure 290 provided by a continuous rib member 340 defining a trapezoidal wave pattern. FIG. 5C depicts an alternative embodiment of a bracket 260 including a guide rib structure 290 provided by a continuous rib member 350 defining a sinusoidal wave pattern.

As will be appreciated, each of the continuous planar slider interface surface 330, the continuous rib member 340, and the continuous rib member 350 provide an unbroken edge defining an interface between the respective guide rib structure 290 and a slider 310. This is shown in more detail in FIGS. 6A-6C.

Figure 6A:
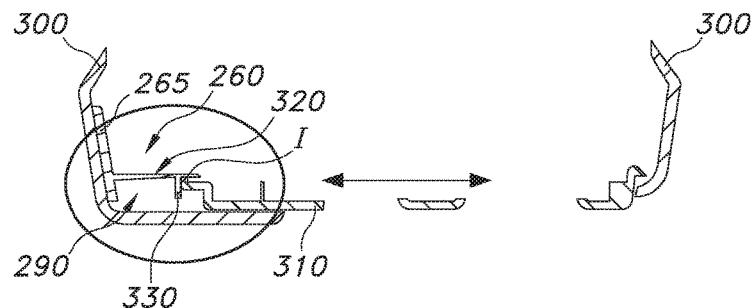
FIG. 6A is a sectional view of an assembly comprising a substrate, a slider, and the bracket of FIG. 5A.

FIG. 6A shows the interface provided by the guide rib structure 290 embodiment of FIG. 5A. As shown in that sectional view, lateral movement (see arrow) is constrained along a full length of the interface I between the continuous planar slider interface surface 330 and the slider 310.

Figure 6B:
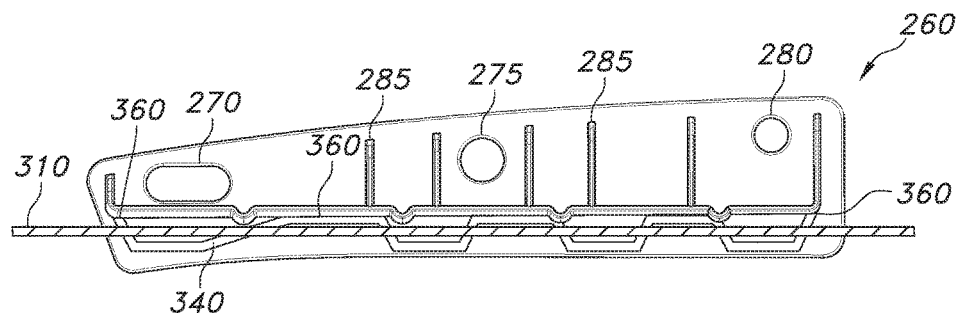
FIG. 6B is a side sectional view of an assembly comprising a substrate, a slider, and the bracket of FIG. 5B.

FIG. 6B shows the interface provided by the guide rib structure 290 embodiment of FIG. 5B. As shown in that side view, lateral movement is constrained along a significant portion of the interface between the continuous rib member 340 and the slider 310. Similarly, as shown in FIG. 6C which provides a side view of the interface provided by the guide rib structure 290 embodiment of FIG. 5C, lateral movement is constrained along a significant portion of the interface between the continuous rib member 350 and the slider 310.

Figure 2:
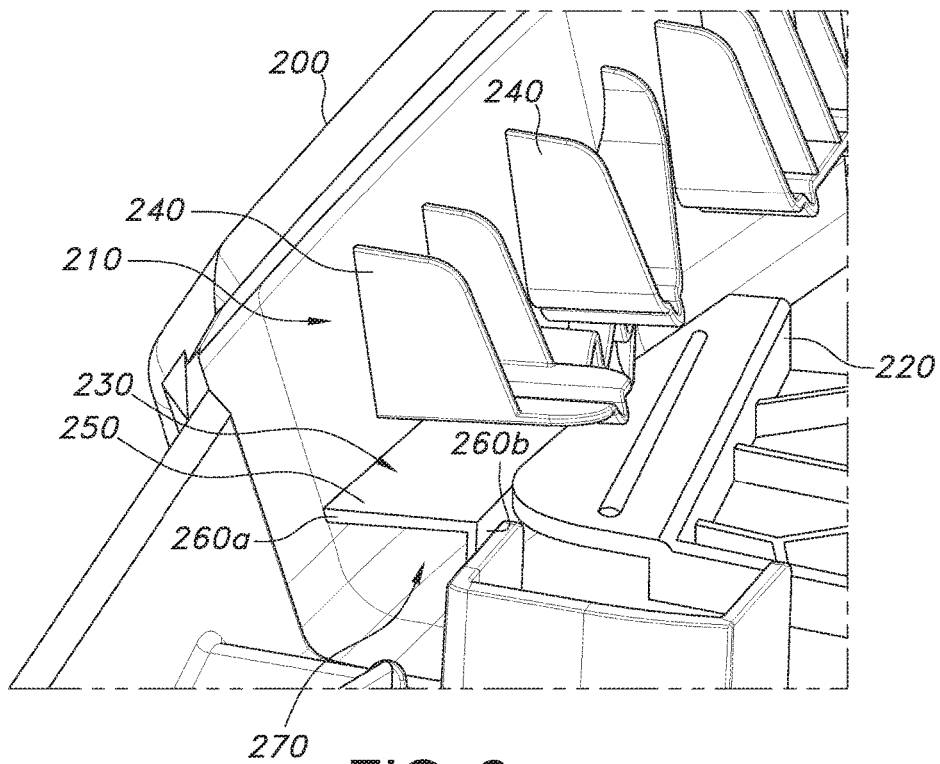
FIG. 2 illustrates an "ideal" guide rib structure.

As will be appreciated each of the continuous rib member 340 and continuous rib member 350, while not providing a fully continuous, uninterrupted point of sliding contact or interface for the slider 310 as does the continuous rib member 320, do provide a significantly enhanced sliding contact therebetween. This approximates the uninterrupted point of sliding contact as shown in FIGS. 2 and 6A. That is, at least one point of contact (an unbroken edge of the continuous rib member 340 and/or the continuous rib member 350) is always maintained between the bracket 260/guide rib structures 290 and the slider 310, providing a smoother sliding operation by eliminating "steps" as is the case for the guide rib structures 120 shown in FIG. 1A. Thus, the sliding contact between the guide rib structures 290 and the slider 310 is improved, and the "steps" encountered using the guide rib structure shown in FIG. 1 are avoided.

Further modifications to the guide rib structures 290 are contemplated. For the wave patterns of the continuous rib member 340 and continuous rib member 350, as is known each wave defines a frequency and an amplitude. In the embodiments depicted herein, each wave of the trapezoidal and sinusoidal wave patterns has a same frequency. In alternative embodiments (not shown) a guide rib structure 290 is contemplated comprising a continuous rib member defining a trapezoidal wave pattern or a continuous rib member defining a sinusoidal wave pattern wherein each wave defines a different frequency F. As will be appreciated, by increasing or decreasing the frequency of the continuous rib member waves, the amount of contact between the guide rib structure 290 and the slider 310 can be increased or decreased as needed according to the particular application. It will also be appreciated that the frequency F of the rib members is also a function of a minimum steel condition feasible in a mold (not shown) to provide for a robust mold design. The higher the frequency F, the better simulation of constant contact between substrate 300 and slider 310 is provided. However, the rib height is an inversely proportional function of frequency F in order to keep the design feasible.

Figure 6C:
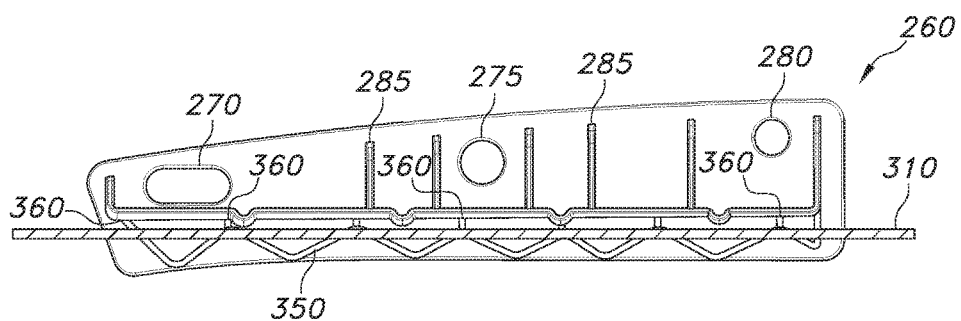
FIG. 6C is a side sectional view of an assembly comprising a substrate, a slider, and the bracket of FIG. 5C.

In an embodiment, the sinusoidal wave pattern shown in FIGS. 5C and 6C is selected due to a desirable material flow within a mold, reducing risk of short shots or cold weld lines, allowing fabrication of taller and thinner rib members, and allowing increased wave frequency F. The trapezoidal wave pattern shown in FIGS. 5B and 6B is compatible with lower frequency F wave patterns, as it reduces bad steel conditions in a mold.

While the continuous rib members 340 and 350 may be provided contacting only an interior surface of the bracket body 265, in embodiments it is contemplated to provide such rib members which are provided with one or more points of contact 360 also to the guide structure 285. This is depicted in FIGS. 4 and 6B-6C. As will be appreciated, this provides structural stability and rigidity to the continuous rib members 340 and 350 so formed.

As will be appreciated, by use of the described bracket 260 including an integral guide rib structure 290 to constrain lateral movement of a slider 310, numerous advantages are realized. The degree of contact between the bracket 260 and slider 310 is significantly improved, always providing at least two points of contact between the bracket and the slider, and indeed provides or approximates the continuous sliding contact interface provided by the "ideal" rib 250 shown above in FIG. 2. By these features, a smooth sliding action between the bracket 260 and the slider 310 is provided without significant intermittent contact or "steps" during the sliding motion. Thus, user satisfaction is increased by providing devices incorporating the described features.

In turn, use of a separate bracket 260 provides attendant advantages because this improved sliding contact can be provided without requiring matching geometries between a substrate 300 and the slider 310. This is so regardless of any distance between a slider 310 edge and a substrate 300 resulting from the pieces' respective geometries. By inclusion of heat stakes, attachment of the bracket 260 to the substrate 300 can be accomplished without leaving sink marks by simply providing suitable bosses on the substrate. Likewise, use of the bracket 260 will not affect appearance of a substrate 300 class A surface because the bracket is attached to the substrate. Therefore, rib members of a greater thickness can be provided without impairing appearance of the substrate.

Advantageously, the bracket 260 can be fabricated in a different mold as is used to fabricate the substrate 300, and so molding constraints are eliminated. The described guide rib structures 290 by their configurations are inherently more robust and rigid than the vertical rib structures 120 shown in FIG. 1A. Further, heat stakes (not shown) may be provided to attach the bracket 260 to the substrate 300, advantageously eliminating the constraint of material welding compatibility, i.e. the need to ensure that the materials of which the bracket and substrate are fabricated are compatible for welding to attach one to the other.

The foregoing has been presented for purposes of illustration and description. It is not intended to be exhaustive or to limit the embodiments to the precise form disclosed. Obvious modifications and variations are possible in light of the above teachings. For example, the foregoing description focused on the described guide rib structures 330 can be applied to manufacture B-pillar trim piece including a gap hider a seat belt height adjustment mechanism. However, the skilled artisan will readily appreciate that the descriptions herein equally apply to any situation wherein a sliding translation of a vehicle part on or in another, static vehicle part is desired, particularly when a geometry of the static part is not parallel to that of the sliding part. For example, this may include sliding lids on quarter trim panels, sliding lids on floor consoles, etc.

All such modifications and variations are within the scope of the appended claims when interpreted in accordance with the breadth to which they are fairly, legally and equitably entitled.

What is claimed:

1. A sliding mechanism, comprising:
   a first part;
   a second part adapted for sliding translation within the first part; and
   a bracket attached to the first part comprising a bracket guide rib structure including a rib defining an unbroken interface contact surface for an edge of the second part.

2. The sliding mechanism of claim 1, wherein the bracket guide rib structure constrains a lateral motion of the second part.

3. The sliding mechanism of claim 2, wherein the bracket guide rib structure comprises a continuous rib member.

4. The sliding mechanism of claim 3, wherein the continuous rib member defines a continuous planar slider interface surface.

5. The sliding mechanism of claim 3, wherein the continuous rib member defines a sinusoidal wave pattern.

6. The sliding mechanism of claim 5, wherein the sinusoidal wave pattern comprises a plurality of waves having a same or a different wave frequency.

7. The sliding mechanism of claim 3, wherein the continuous rib member defines a trapezoidal wave pattern.

8. The sliding mechanism of claim 7, wherein the trapezoidal wave pattern comprises a plurality of waves having a same or a different wave frequency.

9. The sliding mechanism of claim 1, wherein the bracket further includes a guide structure configured to constrain an up-down motion of the second part.

10. The sliding mechanism of claim 9, wherein the bracket guide rib structure is connected to the guide structure at one or more junctures.

11. A trim assembly for a seat belt height adjusting mechanism, comprising:
    a pillar trim panel;
    a slider adapted for sliding translation within the pillar trim panel; and
    a bracket attached to the pillar trim panel comprising a bracket guide rib structure including a rib defining an unbroken interface contact surface for an edge of the slider.

12. The trim assembly of claim 11, wherein the bracket guide rib structure constrains a lateral motion of the slider.

13. The trim assembly of claim 12, wherein the bracket guide rib structure comprises a continuous rib member.

14. The trim assembly of claim 13, wherein the continuous rib member defines a continuous planar slider interface surface.

15. The trim assembly of claim 13, wherein the continuous rib member defines a sinusoidal wave pattern.

16. The trim assembly of claim 15, wherein the sinusoidal wave pattern comprises a plurality of waves having a same or a different wave frequency.

17. The trim assembly of claim 13, wherein the continuous rib member defines a trapezoidal wave pattern.

18. The trim assembly of claim 17, wherein the trapezoidal wave pattern comprises a plurality of waves having a same or a different wave frequency.

19. The trim assembly of claim 11, wherein the pillar trim panel further includes a pillar trim panel guide structure configured to constrain an up-down motion of the slider.

* * * * *